United States Patent [19]
Smith

[11] Patent Number: 5,553,984
[45] Date of Patent: Sep. 10, 1996

[54] ENCAPSULATED NUT

[76] Inventor: Donald E. Smith, 16991 Lowell Cir., Huntington Beach, Calif. 92649

[21] Appl. No.: 370,645

[22] Filed: Jan. 10, 1995

[51] Int. Cl.$^6$ .......................... F16B 19/00; F16B 33/00; F16B 37/14

[52] U.S. Cl. ................ 411/429; 411/377; 411/431; 411/908; 264/278

[58] Field of Search ................ 411/429, 431, 411/371, 373, 377, 908; 264/275, 276, 278

[56] References Cited

U.S. PATENT DOCUMENTS

| | | | |
|---|---|---|---|
| 4,397,437 | 8/1983 | Madej | 411/431 X |
| 4,815,920 | 3/1989 | Morooka | 411/377 X |
| 4,883,399 | 11/1989 | MacLean | 411/377 X |
| 4,887,950 | 12/1989 | Sakayori et al. | 411/431 X |

*Primary Examiner*—Neill R. Wilson
*Attorney, Agent, or Firm*—Leonard Tachner

[57] ABSTRACT

The encapsulated nut of the present invention comprises a stove pipe configured encapsulation, having a base portion for entirely encapsulating the exterior surfaces of a conventional nut such as a nut designed to accommodate a half-inch bolt and having a square exterior shape. The encapsulated nut of the present invention also comprises an integral bore which is configured as an elongated cylinder adapted to receive the portion of the bolt that is threaded through the nut and extends beyond the nut. However, the internal diameter of the bore is greater than the external diameter of the threaded bolt and comprises a smooth surface. Thus, the internal wall surface of the bore is not provided with threads, nor is it cut to form threads when the bolt is threaded through the nut of the invention. Furthermore, there is a small gap between the bore internal wall surface and the threads of the bolt, thus permitting the injection of sealant therebetween to improve the seating engagement between the bolt and the encapsulated nut. The bore is enclosed or capped at the end thereof, opposite the nut. This is done by providing a circular disk-shaped cap which is sonically welded to the open end of the bore, opposite the nut. The entire encapsulation, including the base portion, the bore and the cap is, fabricated by an injection molding process.

9 Claims, 2 Drawing Sheets

ENCAPSULATED NUT

BACKGROUND OF THE INVENTION

1. Field of the Invention

The present invention relates generally to the field of encapsulated hardware which may be made resistant to caustic materials by using a chemically resistant encapsulation material around a nut or bolt or the like, such as for use in sealing tanks which hold such caustic materials, including by way of example, hydrogen-sulfide, brine, oil, wheat, grain and other materials. The present invention relates more specifically to a method and the resulting product thereof, constituting an encapsulated nut which has a stove pipe shape designed to surround all the exterior surfaces of a standard nut, while providing an elongated cylindrically shaped tube attached thereto for receiving a threaded bolt through the nut.

2. Prior Art

The concept of encapsulating a nut for use in a caustic environment, is an old one. Typically, such nuts are encapsulated with a material resistant to caustic environments. Such materials, by way of example, may include a resistant plastic such as Nylon, Delrin or Noryl. A search of the prior art relevant to the present invention has indicated the following patents as being pertinent:

| | |
|---|---|
| 3,557,654 | Weidner Jr. |
| 3,618,444 | Kay et al |
| 3,693,495 | Wagner |
| 4,154,138 | Melone |
| 4,557,654 | Masuda et al |
| 4,582,462 | Thiel |
| 4,883,399 | MacLean |
| 4,887,950 | Sakayori et al |
| 4,907,929 | Johnston Jr. |
| 4,962,968 | Caplin |
| 4,993,902 | Hellon |

U.S. Pat. No. 4,887,950 to Sakayori et al is directed to a waterproof nut for use inside a water storage tank constituting a metallic nut body coated with a synthetic resin and including a cap portion for accommodating the free end of a bolt that projects from the rear surface of the nut. A nut body 1, with a hexagonal outer periphery and internal thread, is coated with a nylon resin layer 2. The resin layer forms a front surface with a lip 4 that covers the front of the nut and a cap-shaped portion 5 for accommodating the free end of the bolt B at the rear of the nut. The lip 4 has a step 7 or a tapered portion 8 to position a packing material. The cap portion may be formed with an internal thread and an external shape for a fastening tool.

U.S. Pat. No. 4,883,399 to MacLean is directed to a plastic encapsulated nut and washer assembly for sealing, providing a lock nut function, and protecting the projected threads of the threaded member and nut assembly. The assembly 10 includes a common hex nut 12 with threaded bore 14 and faces 16, 18 and includes an ordinary washer 20. A cap screw 42 with hex head 44 and threaded shank 40, extends through the bores 34 and 36 of the external parts being fastened, through bore 22 of washer 20 and is screwed into the threaded bore 14 of the encapsulated hex nut 12. The body 50 formed of molded reasonably rigid plastic material, is molded in place around hex nut 12 with a lip 56 to loosely retain the washer 20. The intermediate body portion 60 has a cup-shaped portion 70 with a cap 68 that has a bore sized to be an interference fit on the cap screw, thus providing a lock nut function.

U.S. Pat. No. 4,557,654 to Masuda et al is directed to a resilient nut cover of plastic or rubber for seating and protecting a nut and the projecting screw thread of a bolt. The cover 1 for nut 11 has, in the basal portion 2a, a protruding portion 5 that engages groove 13 on the nut. The cover also has a screw thread 10 in the end portion 2b for providing a disengagement proof means to engage the threaded end of the bolt 15. If the dimension of the base is determined so that the cover is pressed onto the face of the fastened piece 16, then rain and corrosive gas will be prevented not only from the connection between the nut and the bolt, but also between the nut and the fastening piece 16.

U.S. Pat. No. 4,993,902 to Hellon is directed to a plastic capped lock nut assembly that provides protection for exposed threads of a threaded rod or other element extending outwardly of the bore of the lock nut body and ring. The lock nut includes a metal body 32 and a plastic cap 70, secured together by a lock ring 50. The lock ring 50 is secured to the metal body by turning in the flange 44 on the body to engage the shoulder 64 of the lock ring. The assembly is completed by sonic welding the cap 70 to the lock ring.

U.S. Pat. No. 4,907,929 to Johnston Jr. is directed to a cover for the end of a bolt to which a nut is attached. The cover is installed by means of an interference fit. The cover 20 has a body 24 of any suitable outer shape, and has an internal cavity 32 with a first section 34 and a second section 36. The first section 34 is configured to be the shape of the nut 18 to be covered. The second section is cylindrical and has a height greater than the height of the threaded bolt to be covered. The diameter of this cylindrical second section is less than the outer diameter of the threaded bolt 19, but greater than the inner diameter of the threads on bolt 19. This diameter provides an interference fit for the cover over the threaded bolt portion and since the material for the cover is polyurethane, hard rubber or plastic, the material will yield to allow installation.

The difficulty with the aforementioned prior art that is most relevant to the present invention is that it comprises an encapsulated nut having an extended bore, wherein the bore is either threaded or becomes threaded when the bolt thread extends beyond the nut and bites into the wall of a plastic or other material, thereby creating a thread therein. Unfortunately, such an internal thread adds to the resistance to the bolt as it is threaded through the nut and thus reduces the accuracy of torque readings between the bolt and nut. Furthermore, such close interface between the bore and the bolt prevents sealant flowthrough between the extended portion of the bolt and the bore, which could otherwise improve the seating when using a sealant which can otherwise flow through the gap between a non-threaded or smooth bore and a bolt thread. Thus, it would be advantageous if it were possible to provide an encapsulated nut having an extended bore which has a smooth surface that is larger in diameter than the threads of the bolt that is mated with the encapsulated nut.

SUMMARY OF THE INVENTION

The present invention comprises a novel encapsulated nut and a novel method of manufacturing such a nut. Unlike the aforementioned prior art, the encapsulated nut of the present invention comprises a stove pipe configured encapsulation, having a base portion for entirely encapsulating the exterior surfaces of a conventional nut such as a nut designed to accommodate a half-inch bolt and having a square exterior shape. The encapsulated nut of the present invention also comprises an integral bore which is configured as an elongated cylinder adapted to receive the portion of the bolt that is threaded through the nut and extends beyond the nut. However, the internal diameter of the bore is greater than the external diameter of the threaded bolt and comprises a smooth surface. Thus, the internal wall surface of the bore is not provided with threads, nor is it cut to form threads when the bolt is threaded through the nut of the invention. Thus, the present invention uses a bore which is different from that disclosed in the prior art in that the bore surface is retained as a smooth surface, larger than the bolt external diameter, whereby there is no torque resistance to the bolt contributed by the bore as the bolt is threaded through the nut. Furthermore, there is a small gap between the bore internal wall surface and the threads of the bolt, thus permitting the injection of sealant therebetween to improve the seating engagement between the bolt and the encapsulated nut.

In the present invention the bore is enclosed or capped at the end thereof, opposite the nut. This is done by providing a circular disk-shaped cap which is sonically welded to the open end of the bore, opposite the nut. The entire encapsulation, including the base portion, the bore and the cap is, in the preferred embodiment hereof disclosed, fabricated by an injection molding process.

Virtually any material which is adapted to be formed by injection molding may be used to encapsulate the nut and form the cap. Of course, in a preferred embodiment, the encapsulation material should be resistant to caustic chemicals or other environmental influences which would otherwise deteriorate the surface of the encapsulation and ultimately affect the bolt and the nut secured therein. A principal function of the present invention is to provide a means for reliably securing a tank containing caustic materials to an underlying support surface. Securing such tanks typically requires specially protected hardware, such as encapsulated nuts and bolts in order to prevent the tank contents from structurally deteriorating the hardware holding the tank in place, which could otherwise lead to catastrophic results.

In the method of the present invention, the nut to be encapsulated is placed into a die on a shaft that holds the nut in place and allows the nut to be captured on the very edge of the counterbore of the nut to obtain proper shut off of the material into the threads. This capturing is accomplished by spring-loading the cavities to permit proper pressure to be applied to seal off any inadvertent material intrusion. The material forming the encapsulation is then injected around the nut and up into an annulus of the stem to prevent the bolt ample clearance and to not restrict the threading of the nut to the bolt as is found in the prior art.

To complete the encapsulation, a cap is molded at the same time as the nut encapsulation and then applied to the top of the bore shaft by ultrasonic welding to produce a homogenous one-piece encapsulation. This method of fabrication is faster than other methods that require the nut to be threaded and unthreaded onto the shafts in the cavities, which is a time-consuming task that increases the cost of manufacture and results in an encapsulated nut lacking the advantages of the present invention as described herein.

Encapsulation materials may be any material which is designed to be injection molded, but is preferably a caustic chemical resistant material, such as Noryl or Delrin or Teflon or Nylon, depending upon the nature of the chemicals that must be resisted in a particular application.

OBJECTS OF THE INVENTION

It is therefore a principal object of the present invention to provide an encapsulated nut, especially adapted to be used for securing tanks in conjunction with bolts and to be resistant to caustic materials such as brine or hydrogen sulfide and the like, which would otherwise diminish the structural integrity of nuts and bolts securing such tanks.

It is an additional object of the present invention to provide an encapsulated nut, designed to receive an elongated bolt, the encapsulated nut comprising a base portion having a standard nut therein and having a surrounding encapsulation which covers all the exterior surfaces of the nut and also comprising an elongated bore or a hollow cylindrical chamber which is designed to encircle the portion of the bolt which extends beyond the nut.

It is still an additional object of the present invention to provide an encapsulated nut which is surrounded by an encapsulation material resistant to caustic chemicals, the encapsulation comprising a base portion surrounding the nut and a bore portion which is in the form of an elongated hollow cylinder for receiving the portion of the bolt which extends beyond the nut after threading therethrough, the interior wall surface of the bore being larger than the thread diameter of the bolt to permit sealant material to be place therebetween and to avoid restriction of the bolt to more accurately indicate the torque that actually tightens the bolt into the nut.

It is still an additional object of the present invention to provide a method for producing a encapsulated for use in securing a bolt in a caustic environment which would otherwise attack the surface structural integrity of the nut and bolt, the encapsulation method comprising an injection molding process using spring loaded cavities and a pair of mandrels and wherein a cap is produced simultaneously for sonic welding to a bore portion of the encapsulation.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
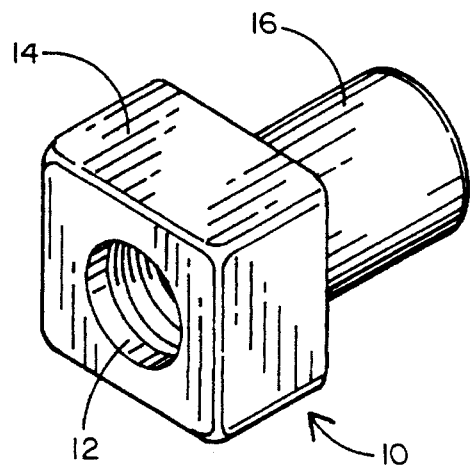
FIG. 1 is a nut-end three-dimensional view of the encapsulated nut of the invention.
Figure 2:
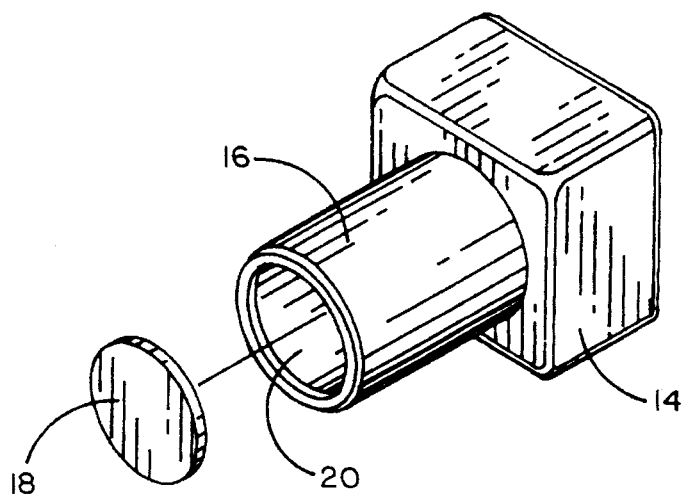
FIG. 2 is a bolt-shaft-end three-dimensional view thereof with the cap shown separated therefrom.
Figure 3:
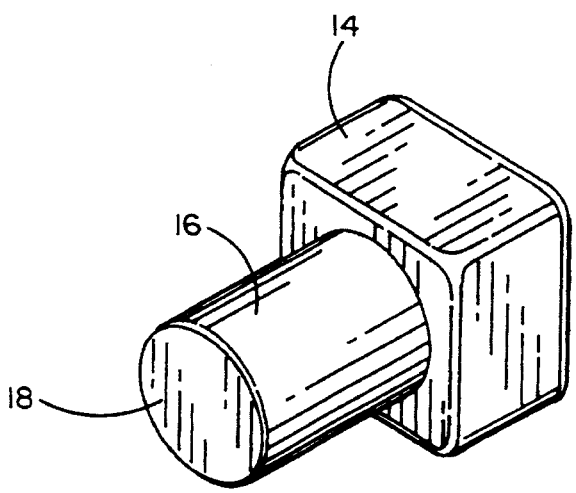
FIG. 3 is a view of the invention similar to that of FIG. 2, but with the cap in its welded configuration.
Figure 4:
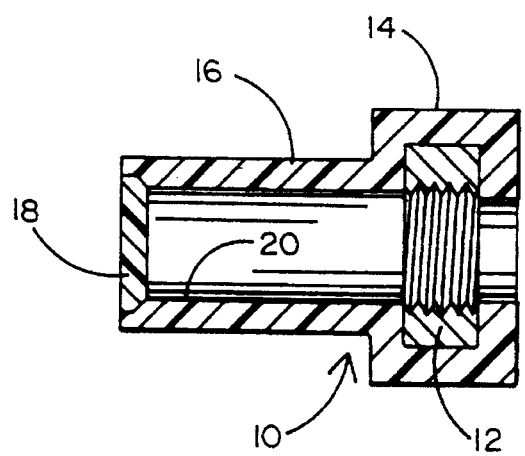
FIG. 4 is a cross-section view of the invention.

Referring now to the accompanying FIGS. 1–4, it will be seen that the encapsulated nut 10 of the present invention, comprises a nut 12 having all of its exterior surfaces encapsulated by a plastic material forming a base portion 14 and a bolt-shaft portion 16. The bolt-shaft portion has a smooth interior surface 20 and an open end opposite the bolt, the open end being designed to be enclosed by a cap 18 which may be sonically welded to the shaft portion 16 in the preferred embodiment hereof. It will be understood that the bolt-shaft portion 16 is designed to receive the portion of a bolt (not shown) that extends beyond the nut 12 when the nut and bolt are fully engaged. It will also be understood that the interior surface 20 of the shaft 16 has a smooth surface and an interior diameter which exceeds the maximum thread diameter of the mating bolt. The size and smooth surface of the interior surface 20 overcomes two distinct disadvantages of the prior art previously described. First of all, it prevents the shaft 16 from interfering with torque measurement of a bolt/nut engagement using the present invention. Secondly, it permits the use of a viscous fluid sealant around the extended threads of the bolt present in the shaft, adjacent the surface 20. Such sealant may be used to further increase the resistance of the bolt and nut to environmental influences that might otherwise defeat the purposes herein described.

Figure 5:
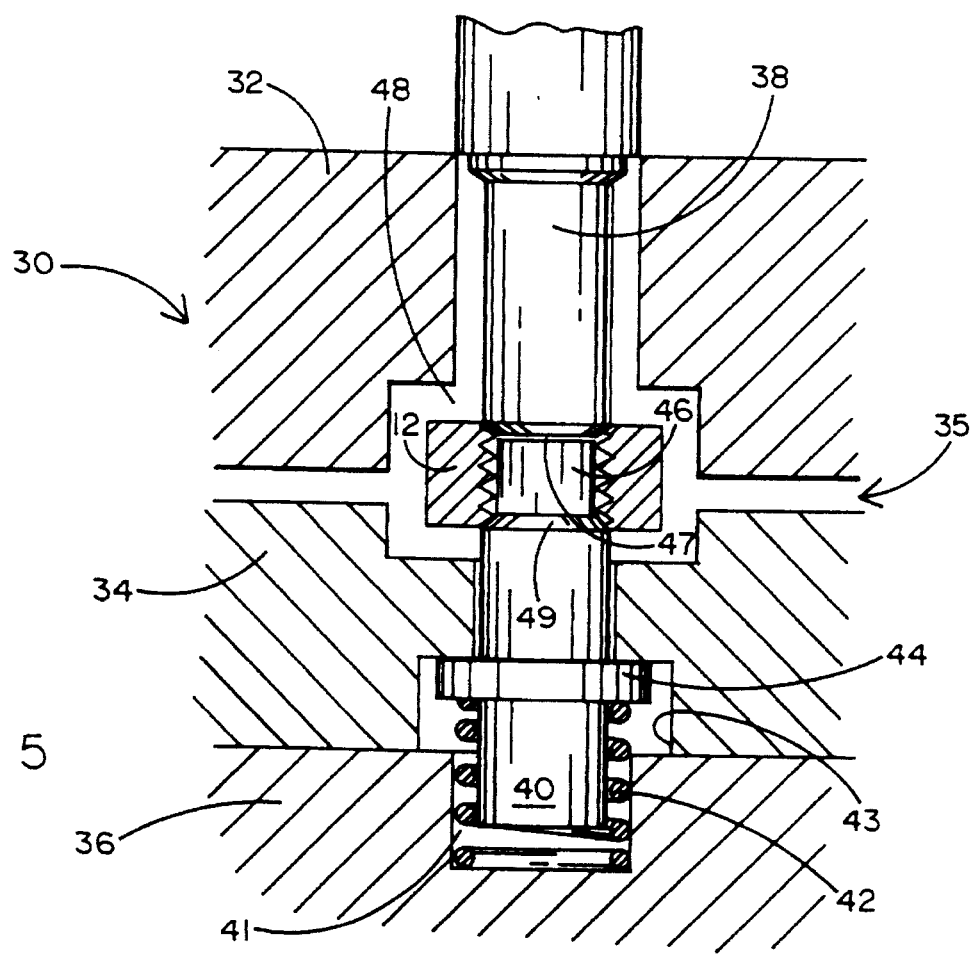
FIG. 5 is a partially cross-sectioned view of an injection molding tool used in carrying out the fabrication process of the invention.

The manner in which an encapsulated nut 10 of the present invention shown in FIGS. 1–4 may be fabricated, may be best understood by referring to FIG. 5 which illustrates a preferred embodiment of injection mold tooling used to manufacture the present invention. More specifically, as shown in FIG. 5, an injection molding tool 30 also comprises a first mold member 32, a second mold member 34 and third mold member 36. The first and second mold members 32 and 34 are shaped to provide an injection channel 35 therebetween which may be used to permit the injection of the selected plastic material used to encapsulate the nut 12. It will also be seen in FIG. 5 that the injection molding tool 30 comprises a first mandrel 38 and a second mandrel 40. The second mandrel 40 is partially inserted into a circular wound spring 42 and both the end of the mandrel 40 and the spring are positioned within a cylindrical recess 41 in the third mold member 36. It will also be seen that the second mandrel 40 is provided with an annular flange 44 which is positioned for limited movement within a flange chamber 43, formed within the second mold member 34, adjacent the cylindrical recess 41 of the third mold member 36. It will also be seen in FIG. 5 that the second mandrel 40 provides a reduced diameter section 46, the outer diameter of which is selected to fit within the threads of the nut 12 with little contact or friction therebetween. In a preferred embodiment hereof, the second mandrel 40 is magnetized to retain the nut on the reduced diameter section 46 without any frictional engagement between the nut and the reduced diameter section.

It will also be seen that between the reduced diameter section 46 and the remaining portion of the second mandrel 40, there is a tapered shoulder 49 which is configured to mate with the beginning thread of the nut 12. The engagement between the tapered shoulder 49 and the first thread of the nut 12, provides a means for preventing plastic from entering the interior of the nut 12 during the injection molding process. It will also be seen in FIG. 5 that the first mandrel 38 also provides a tapered portion which mates with the other end of the thread (or last thread) within the nut 12 in the same manner, thus preventing any plastic from entering the interior of the nut upon injection of molten plastic into the mold. Furthermore, it will be seen that the reduced section 46 of second mandrel 40 is slightly spaced from the tapered portion of first mandrel 38 to form a gap 47 therebetween. This gap assures that there is no resistance to compression of the spring 42, which would otherwise interfere with the engagement between the first threads on each end of the nut and the respective mandrels 40 and 38. FIG. 5 also illustrates an annular region 48 provided between the mandrel 38 and the first mold member 32 along the region above the nut 12, as seen in FIG. 5, as well as around the entire nut 12 and around that portion of the second mandrel 40 which extends above the second mold member 34.

Based on the foregoing, it can be seen that the injection molding tool 30 of the present invention, permits a process of fabrication resulting in an encapsulated nut of a type shown in FIGS. 1–4. Most importantly, a fully encapsulated nut is fabricated, the nut having a shaft portion for receiving a bolt, the shaft portion having a smooth interior surface that is larger than the bolt diameter to achieve the aforementioned advantages as compared to the prior art.

Those having skill in the art to which the present invention pertains, will now as a result of the applicant's teaching herein, perceive various modifications and additions which may be made to the invention. By way of example, the specific plastic materials referred to herein may be readily substituted by other materials which have protective characteristics against selected caustic materials. In addition, the precise shape of the encapsulation may be readily altered to accommodate different size bolts, as well as to provide different degrees of protection against caustic materials. Accordingly, all such modifications and additions that may be made to the invention are deemed to be within the scope thereof, which is to be limited only by the claims appended hereto and their equivalents.

I claim:

1. An encapsulated nut for use with a bolt in securing a mechanical connection in a caustic environment; the encapsulatd nut comprising:

a threaded nut having an interior surface and an exterior surface;

an encapsulation covering all of said exterior surface of said nut, said encapsulation having a base portion covering said exterior surface and having a cylindrical shaft portion for receiving said bolt extending through said nut, said shaft portion having a hollow smooth interior for receiving said bolt;

wherein said shaft is open at an end thereof opposite said nut.

2. The encapsulated nut recited in claim 1 wherein said base portion and said cylindrical shaft portion are integral portions of a unitary encapsulation.

3. The encapsulated nut recited in claim 1 wherein said encapsulation is applied to said exterior surface by injection molding.

4. An encapsulated nut for use with a bolt in securing a mechanical connection in a caustic environment; the encapsulatd nut comprising:

a threaded nut having an interior surface and an exterior surface;

an encapsulation covering all of said exterior surface of said nut, said encapsulation having a base portion covering said exterior surface and having a cylindrical shaft portion for receiving said bolt extending through said nut, said shaft portion having a hollow smooth interior for receiving said bolt;

wherein said shaft is enclosed by a cap.

5. The encapsulated nut recited in claim 4 wherein said cap is made integral to said shaft.

6. The encapsulated nut recited in claim 5 wherein said cap is welded to said shaft.

7. An encapsulated nut for use with a bolt in securing a mechanical connection in a caustic environment; the encapsulatd nut comprising:

a threaded nut having an interior surface and an exterior surface;

an encapsulation covering all of said exterior surface of said nut, said encapsulation having a base portion covering said exterior surface and having a cylindrical shaft portion for receiving said bolt extending through said nut, said shaft portion having a hollow smooth interior for receiving said bolt;

wherein said hollow smooth interior is larger in diameter than said interior surface of said nut.

8. A method of encapsulating a nut for use with a bolt in securing a mechanical connection in a caustic environment; the method comprising the steps of:

a) placing said nut on a first mandrel, said first mandrel having a reduced diameter section extending through said nut and forming a tapered shoulder for engaging said nut at a first thread thereof;

b) securing said nut with a second mandrel axially aligned with said first mandrel and having a tapered shoulder for engaging said nut at a last thread thereof;

c) axially compressing said first and second mandrels against a spring;

d) forming a cavity around said nut and said second mandrel, said cavity being configured to conform to a desired encapsulation shape;

e) injecting a selected molten plastic into said cavity; and f) opening said cavity after said plastic has cooled to a solid.

9. The method recited in claim 8 further comprising the step of:

g) welding a cap to said encapsulated nut to seal off an orifice other than a bolt orifice into said nut.

* * * * *